United States Patent
McCrank et al.

(10) Patent No.: US 6,865,375 B1
(45) Date of Patent: Mar. 8, 2005

(54) METHOD AND APPARATUS FOR LOCATING A SYNCHRONIZATION SIGNAL

(75) Inventors: Christopher L. McCrank, Austin, TX (US); Javier V. Magaña, Austin, TX (US)

(73) Assignee: Legerity, Inc., Austin, TX (US)

( * ) Notice: Subject to any disclaimer, the term of this patent is extended or adjusted under 35 U.S.C. 154(b) by 817 days.

(21) Appl. No.: 09/256,543

(22) Filed: Feb. 24, 1999

(51) Int. Cl.[7] .............................................. H04Q 7/20
(52) U.S. Cl. ...................... 455/70; 455/502; 455/462
(58) Field of Search ......................... 455/70, 502, 462, 455/463, 464, 465; 370/350, 328, 329

(56) References Cited

U.S. PATENT DOCUMENTS

| | | | |
|---|---|---|---|
| 5,267,244 A | * | 11/1993 | Messerschmitt et al. .... 370/342 |
| 5,398,258 A | * | 3/1995 | Su et al. ...................... 375/277 |
| 5,926,752 A | * | 7/1999 | Lin .............................. 455/323 |
| 6,052,407 A | * | 4/2000 | Ciccone et al. ............. 375/133 |

* cited by examiner

Primary Examiner—Erika A. Gary
(74) Attorney, Agent, or Firm—Williams, Morgan & Amerson

(57) ABSTRACT

In one aspect of the present invention, a method and apparatus are provided. The method includes detecting a synchronization signal within a plurality of channels. The method includes selecting a subset of the plurality of channels, wherein the subset includes more than one channel. The method further includes determining if the synchronization signal exists on at least one of the subset of channels and initiating communications in response to determining that the synchronization signal exists on at least one of the subset of channels.

13 Claims, 4 Drawing Sheets

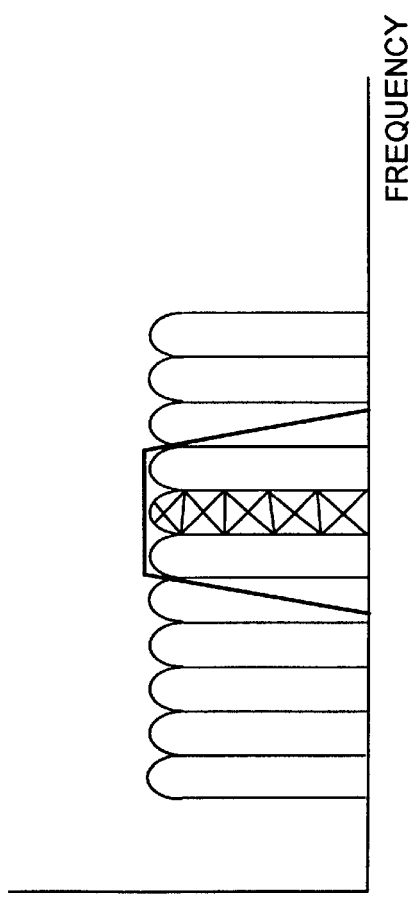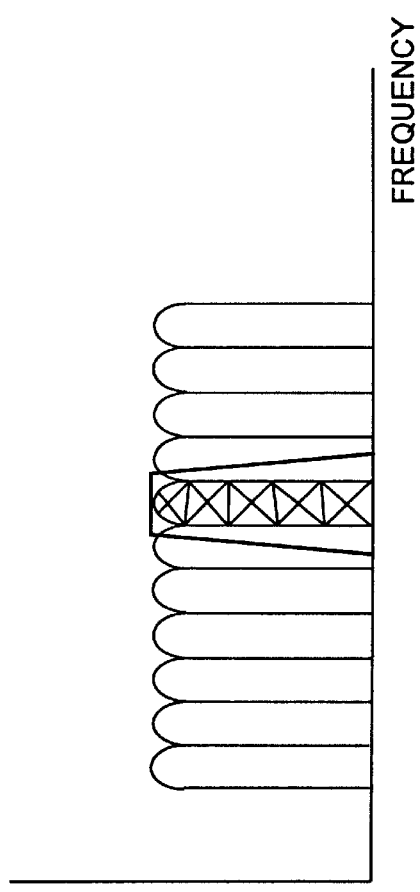

METHOD AND APPARATUS FOR LOCATING A SYNCHRONIZATION SIGNAL

BACKGROUND OF THE INVENTION

1. Field of the Invention

The present invention relates generally to communications, and, more particularly, to a method and apparatus for locating a synchronization signal in a communications device, such as a cordless telephone, for example.

2. Description of the Related Art

The telecommunications industry has undergone explosive growth over the past several years. A significant contribution to this growth has been the high demand for radio communication services, such as cordless telephone service, for example. Cordless telephones provide a greater flexibility to a user than traditional landline phones by allowing them to move freely, and not tethered to the landline telephone system.

A typical cordless telephone system includes a handset unit and a base unit. The base unit is coupled to a telephone line and includes an antenna, a transmitter, and a receiver for communicating via radio frequencies with the handset unit. A local power line generally supplies the power for the base unit. The handset unit includes a speaker and a microphone, and also an antenna, a transmitter and a receiver for likewise communications with the base unit. Typically, the handset unit is powered by at least one battery. This battery is usually charged by the local power line when the handset unit is placed inside a cradle of the base unit.

Under typical operating conditions, a user generally removes the handset unit from the base unit to make calls. The user is able to roam freely about the location to make and receive calls, as long as the user stays within the generally transmitting and receiving range of the base unit. If a user desires to place a call using the handset unit, the transmitter in the handset unit generates a synchronization signal that is transmitted to the base unit. Upon receipt and detection of the synchronization signal, the base unit connects to the telephone lines and passes the voice/data signals received from the handset unit within a given channel to the telephone line. If an incoming telephone ringing signal is sensed by the base unit, reflecting an incoming call, the base unit, in turn, transmits a synchronization signal to the handset unit where it is detected by the receiver of the handset unit.

The handset unit during a standby mode (i.e., not in actual use) periodically powers-up and scans the channel range for incoming calls from the base unit. The duration of the scan cycle is one factor that determines the power consumption from the battery during standby, and therefore sets the total time the handset unit may be out of the cradle before recharging is needed.

Scanning for incoming calls is generally accomplished by programming the receiver in the handset for a specific channel frequency, waiting for a period of time to determine the presence or absence of a known synchronization signal, and sequentially stepping through the remaining channels. Thus, the receiver of the handset must generally tune to and dwell upon all the channels to look for an incoming call from the base unit. However, the above described method of sequentially scanning for the synchronization signal through all the channels may sometimes prove to be inefficient, resulting in more power consumption from the battery while the handset unit is in the standby mode.

The present invention is directed to overcoming, or at least reducing the effects of, one or more of the problems set forth above.

SUMMARY OF THE INVENTION

In one aspect of the present invention, a method is provided for detecting a synchronization signal within a plurality of channels. The method includes selecting a subset of the plurality of channels, wherein the subset includes more than one channel. The method further includes determining if the synchronization signal exists on at least one of the subset of channels and initiating communications in response to determining that the synchronization signal exists on at least one of the subset of channels.

In another aspect of the present invention, an apparatus is provided for detecting a synchronization signal within a plurality of channels. The apparatus includes a receiver, a filter, a demodulator, and a controller. The receiver is capable of receiving signals over the plurality of channels. The filter is capable of allowing a subset of the plurality of channels to pass through the first filter, wherein the subset includes more than one channel. The demodulator is capable of demodulating over a bandwidth encompassing the subset of the plurality of channels. The controller is capable of initiating communications in response to determining that the synchronization signal exists on at least one of the subset of channels.

BRIEF DESCRIPTION OF THE DRAWINGS

The invention may be best understood by reference to the following description taken in conjunction with the accompanying drawings, in which like reference numerals identify like elements, and in which:

FIGS. 4A and 4B graphically illustrate one embodiment of detecting a synchronization signal transmitted by the base unit of FIG. 1.

Figure 1:
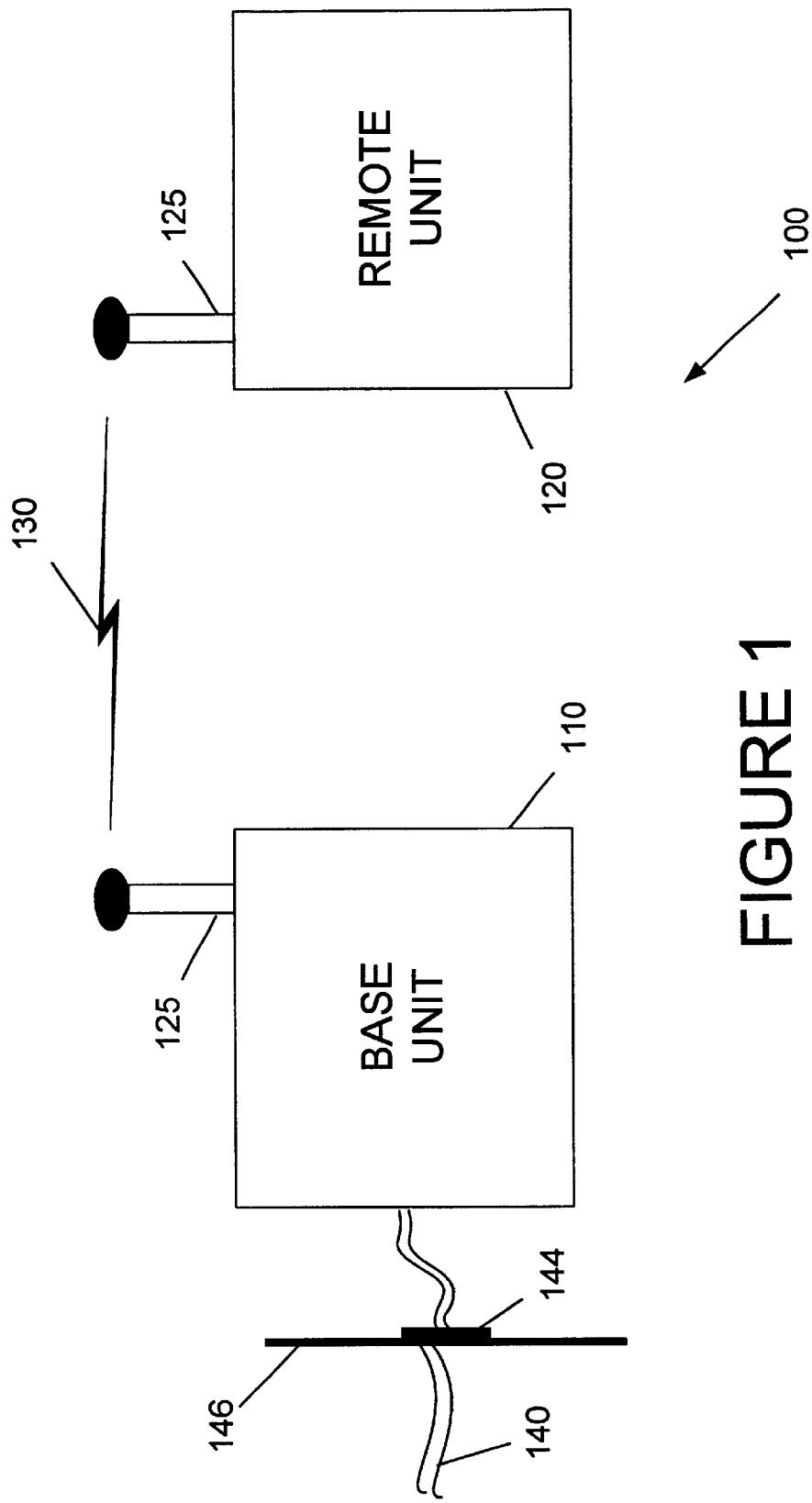
FIG. 1 is a simplified block diagram of a communications system including a base unit and a remote unit.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of a communications system 100 is shown in accordance with the present invention. The communications system 100 includes a base unit 110 and a remote unit 120. The base and remote units 110, 120 each include an antenna 125 for communication over a radio frequency (RF) link 130. In one embodiment, the communications system 100 is embodied as a digital cordless telephone system. The base unit 110 is coupled to an external line 140 via a telephone line interface 144 that is affixed to a fixed structure 146. The fixed structure 146, for example, may be a wall. The external line 140 may be a public switched telephone network (PSTN) line or a private branch exchange (PBX) line. The base unit 110 is coupled to the external line 140 to provide telephonic services to the remote unit 120. In accordance with one embodiment, the remote unit 120 takes the form of a cordless handset, and includes conventional components (i.e., microphone, speaker, dial keypad, etc.) inherent to cordless phones. Such components are well known to those of ordinary skill in the art and are not discussed herein to avoid unnecessarily obscuring the present invention.

Figure 2:
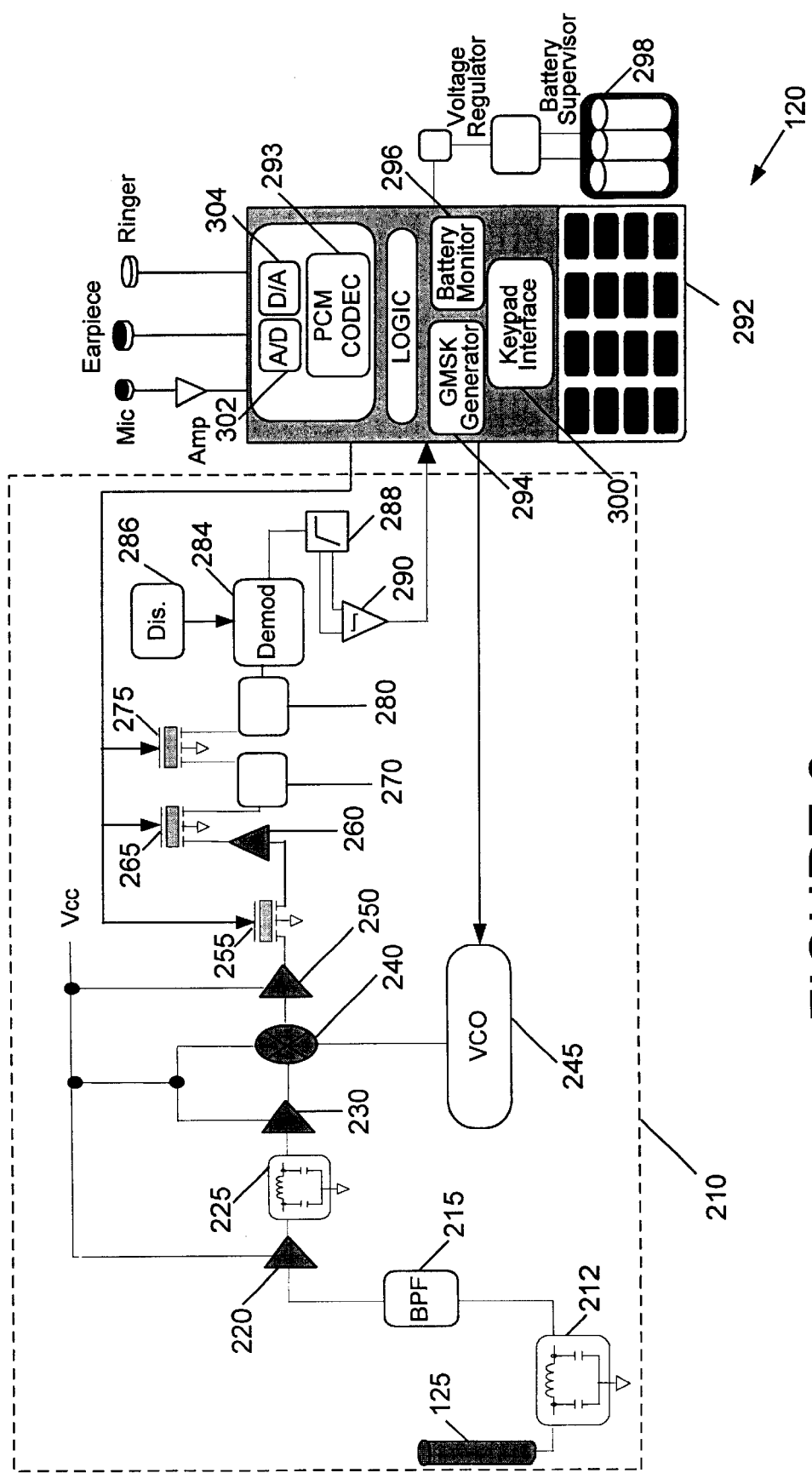
FIG. 2 illustrates a stylized block diagram of one embodiment of the remote unit of FIG. 1.

Turning now to FIG. 2, a stylized block diagram of one embodiment of the remote unit 120 in accordance with the present invention is shown. The remote unit 120 is capable of establishing a radio communication link with the base unit 10. In the interest of clarity and to avoid obscuring the invention, only that portion of the remote unit 120 that is helpful in understanding the invention is illustrated. More specifically, FIG. 2 illustrates a receive unit 210 of the remote unit 120 that may be utilized for receiving signals from the base unit 110. Those skilled in the art will appreciate that the remote unit 120 may also include a transmitting unit (not shown), as well as other logic for implementing other telephonic features such as caller identification system, for example. Additionally, although the remote unit 120 illustrated in FIG. 2 employs a time division duplex (TDD) architecture, it is envisioned that the remote unit 120 may also employ a frequency division duplex (FDD) without departing from the spirit of the instant invention.

The receive unit 210 receives a transmitted radio signal from the antenna 125, and passes the signal through a first impedance matching filter 212. The radio signal may comprise a plurality of signals, at least one of which may be carrying a synchronization signal transmitted by the base unit 120. The first impedance matching filter 212 matches the impedance of the antenna 125 with the impedance of the rest of the receiving unit 210, thereby reducing the signal reflection from the remaining portion of the receiving unit 210. An output signal from the first impedance matching circuit 212 is passed through a first bandpass filter 215, which filters out the unwanted frequencies from the radio signal. The radio signal is then passed through a first amplifier 220, and subsequently through a second impedance matching filter 225. The second impedance matching filter 225 matches the output impedance of the first amplifier 220 to the impedance of the rest of the receiving unit 210. Although not so limited, in the illustrated embodiment, the first and second impedance matching filters 212, 225 have a real 50-ohm impedance. Furthermore, in the illustrated embodiment, the center frequency of the first bandpass filter 215 is 900 MHz, and its bandwidth is approximately 2 MHz. Those skilled in the art will appreciate that the impedance of the impedance matching filters 212, 225, as well as the center frequency and bandwidth of the first bandpass filter 215, may vary, depending on the application in which they are employed.

The voice signal is then provided from the second impedance matching filter 225 to a second amplifier 230 and then to a mixer 240 (or downconverter). The mixer 240 mixes the incoming signal with a signal generated by a local oscillator 245 and provides an intermediate frequency (IF) signal. In one embodiment, and as described in more detail below, the local oscillator may be programmed to generate frequencies that allow the remote unit 120 to search all of the channels for the synchronization signal. The intermediate frequency signal is substantially equal to the difference between the radio frequency signal and the oscillator frequency generated by the local oscillator 245. The IF signal from the mixer 240 is then provided to a third amplifier 250 and to a second bandpass filter 255. The output from the second bandpass filter 255 is amplified by a fourth amplifier 260, passed through a third bandpass filter 265, amplified by a first limiting amplifier 270, passed through a fourth bandpass filter 275, and then amplified by a second limited amplifier 280. In accordance with one embodiment of the present invention, the second, third, and fourth bandpass filters 255, 265, 275 are ceramic filters that have a center frequency of approximately 10.7 MHz and an adjustable bandwidth that is capable of allowing either a single channel or a subset of channels through, as described in more detail below.

The output signal from the second limited amplifier 280 is provided to a demodulator 284, which outputs a voltage signal that is proportional to the frequency of the input signal. The demodulator 284 employs a discriminator 286 that allows the demodulator 284 to demodulate a wide bandwidth. The output signal from the demodulator 284 is passed through a low pass filter 288, which substantially removes unwanted noise from the voltage signal provided by the demodulator 284. An output of the low pass filter 288 is provided to a comparator 290, which compares the input signal against a threshold and provides a substantially square output that is then provided to a controller 292 of the remote unit 120.

The controller 292 may, in one embodiment, control a variety of functions of the remote unit. For example, in the instant embodiment, the controller 292 includes a CODEC 293, GMSK generator 294, battery monitor 296 for monitoring usage of the battery 298, keypad interface 300, and analog-to-digital converter and digit-to-analog converter 302, 304 for conversion of analog signals to digital signals, and vice-versa. The CODEC 293, GMSK generator 294, battery monitor 296, keypad interface 300, and analog-to-digital converter and digit-to-analog converter 302, 304 are well known to those of ordinary skill in the art and are therefore not discussed in detail herein. The term "controller," as utilized herein, refers to control logic capable of providing one or more desirable functions for the remote unit 120. Accordingly, in one embodiment the controller 292 may provide fewer functions than the illustrated functions in FIG. 2, and in other embodiments it may provide additional functions not expressly illustrated in FIG. 2, such as caller identification system (not shown), for example.

Figure 3:
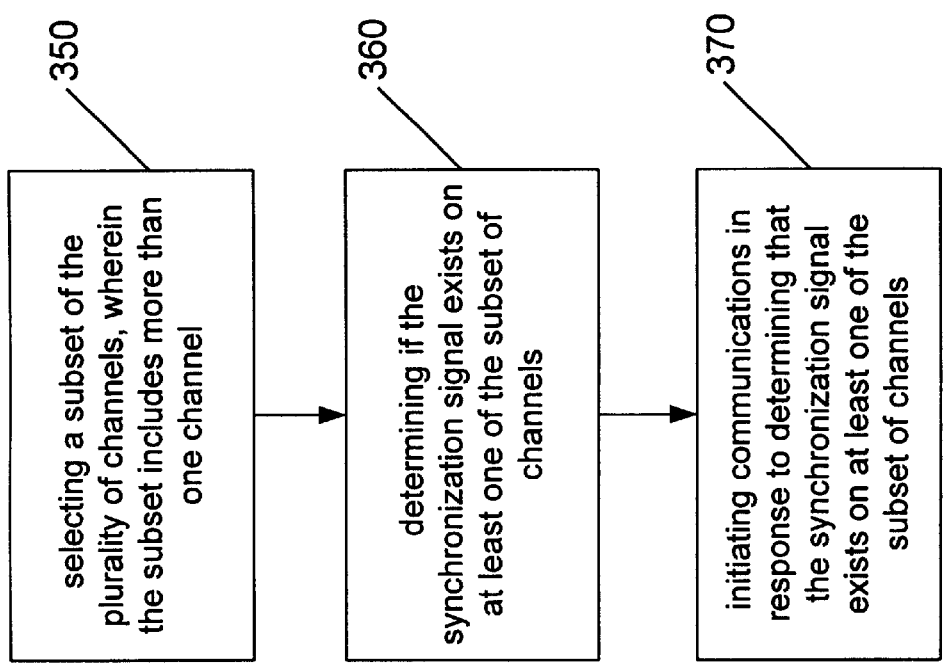
FIG. 3 illustrates one embodiment of a method in accordance with the present invention that may be implemented by the remote unit of FIG. 2.

The remote unit 120 of FIG. 2 is capable of employing a method of FIG. 3 in accordance with the present invention to efficiently scan for an incoming synchronization signal transmitted by the base unit 110 (see FIG. 1). For illustrative purposes, it is assumed that the remote unit is initially in a standby mode and then "wakes" up to scan for a synchronization signal within a plurality of channels. The method of FIG. 3 begins at block 350, where the remote unit 120 selects a subset of the plurality of channels to search for the synchronization signal, wherein the subset includes more than one channel. That is, instead of sequentially searching for the synchronization signal on each of the plurality of channels one at a time, the remote unit 120 selects, for example, a subset (e.g., three channels—channels 1, 2, 3, or some other combination) of channels to search for the presence of the synchronization signal. FIG. 4A illustrates an exemplary search for the synchronization signal within a subset of three channels at a time. The controller 292 programs the oscillator 245 in response to selecting a subset of channels. The controller 292 may program the oscillator using a variety of well-known techniques, such as via an industry-standard 3-wire serial interface, for example. For example, in the case where the subset of channels comprises three channels (i.e., channels 1, 2, and 3), the oscillator 245, in one embodiment, may be programmed to allow channel 2, as well as two adjacent channels (i.e., channels 1 and 3), to pass through the bandpass filters 255, 265, 275.

At block 360, the remote unit 120 determines if the synchronization signal exists on at least one of the selected subset of channels. At block 370, the controller 292 of remote unit 120 initiates communications with the base unit in response to determining that the synchronization signal exists on at least one of the subset of channels. Specifically, once the controller 292 of the remote unit 120 identifies the presence of the synchronization signal within the subset of channels, the controller 292 reprograms the oscillator, as well as narrows the filter bandwidth of the bandpass filters 255, 265, 275, to allow reception of only that channel having the synchronization signal. The channel carrying the synchronization signal may be identified by the data provided in the synchronization signal itself. The incoming signal generally contains two fields—one a synchronization field used to obtain bit and frame synchronization, and the other a data field. This data field conveys control data between the remote and base units 110, 120, and may be configured to carry channel information. FIG. 4B, for example, illustrates the controller 292 narrowing the bandwidth of the filters 255, 265, 275 to allow only the channel carrying the synchronization signal to pass through.

If the synchronization signal is not detected within the first subset of channels, then the controller 292 programs the oscillator 245 to step through the next subset of channels. Each subset of channels is analyzed until all of the channels have been scanned. Afterwards, the remote unit 120 goes back to sleep. During the next "wake-up" cycle, the remote unit 120 repeats the above-described method in search of the synchronization signal.

It should be noted that the synchronization signal in the illustrated embodiment is searched over three channels (i.e., subset of three) at a time for illustrative purposes only. It is therefore envisioned a subset comprising a different number of channels may also be utilized without departing from the spirit and scope of the invention. For example, the present invention may be employed by scanning two channels at a time to detect the synchronization signal. Similarly, other subset combinations may also be employed.

The present invention allows a quicker and more efficient means of detecting the synchronization signal transmitted by the base unit 110 on multiple channels rather than on individual channels. Upon detection of the synchronization signal, the controller 292 of the remote unit 120 would switch to a narrow, single-channel reception for a better signal-to-noise ratio. Accordingly, the present invention allows for both battery life efficient scan cycles and improved performance.

It is noted that the present invention is not limited to telephony, and, instead, may also be applicable to wireless LAN, wireless telemetry, and any other wireless technology employing FSK modulation that operates over a range of channels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for detecting a synchronization signal within a plurality of channels, comprising:
   a receiver capable of receiving signals over the plurality of channels;
   a filter capable of allowing a subset of the plurality of channels to pass through the filter, wherein the subset includes more than one channel;
   a demodulator capable of demodulating over a bandwidth encompassing the subset of the plurality of channels; and
   a controller capable of initiating communications in response to determining that the synchronization signal exists on at least one of the subset of channels.

2. The apparatus of claim 1, wherein the controller is capable of identifying a channel having the synchronization signal.

3. The apparatus of claim 1, wherein the controller identifies the channel having the synchronization signal based upon data within the synchronization signal.

4. The apparatus of claim 3, wherein the controller modifies the bandwidth of the filter to allow only the channel having the synchronization signal.

5. The apparatus of claim 4, wherein the controller is capable of initiating communications over the channel having the synchronization signal.

6. The apparatus of claim 5, wherein the subset comprises three channels.

7. The apparatus of claim 6, wherein the controller is capable of selecting a first channel and two channels adjacent the first channel, wherein one adjacent channel is a channel preceding the first channel and the other adjacent channel is a channel subsequent to the first channel.

8. The apparatus of claim 7, wherein the controller is further capable of selecting another subset of channels and determining the presence of synchronization signals within the remaining plurality of channels.

9. A communications system, comprising:
   a base unit adapted to transmit a synchronization signal within at least one of a plurality of channels;
   a remote unit adapted to receive and transmit signals from the base unit, the remote unit comprising:
      a receiver capable of receiving signals over the plurality of channels;
      a filter capable of allowing a subset of the plurality of channels to pass through the filter, wherein the subset includes more than one channel;
      a demodulator capable of demodulating over a bandwidth encompassing the subset of the plurality of channels; and a controller capable of initiating communications in response to determining that the synchronization signal exists on at least one of the subset of channels.

10. The communications system of claim 9, wherein the controller is capable of identifying a channel having the synchronization signal.

11. The communications system of claim 10, wherein the controller identifies the channel having the synchronization signal based upon data within the synchronization signal.

12. The communications system of claim 11, wherein the controller modifies the bandwidth of the filter to allow only the channel having the synchronization signal.

13. An apparatus for detecting a synchronization signal within a plurality of channels, comprising:
- means for selecting a subset of the plurality of channels, wherein the subset includes more than one channel;
- means for substantially simultaneously determining if the synchronization signal exists on at least one of the subset of channels; and
- means for initiating communications in response to determining that the synchronization signal exists on at least one of the subset of channels.

* * * * *